United States Patent
Patel et al.

(10) Patent No.: US 11,626,688 B2
(45) Date of Patent: Apr. 11, 2023

(54) FIELD TERMINABLE CABLE AND PLUG ASSEMBLY

(71) Applicant: Panduit Corp., Tinley Park, IL (US)

(72) Inventors: Satish I. Patel, Roselle, IL (US);
Benjamin S. Novak, Lockport, IL (US); Adam Sargis, Frankfort, IL (US); Robert L. Fritz, Elwood, IL (US); Scott E. Goska, Hazel Crest, IL (US); Gabriela R. Sims, Gary, IN (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/318,567

(22) Filed: May 12, 2021

(65) Prior Publication Data
US 2021/0376519 A1 Dec. 2, 2021

Related U.S. Application Data

(60) Provisional application No. 63/066,430, filed on Aug. 17, 2020, provisional application No. 63/031,868, filed on May 29, 2020.

(51) Int. Cl.
| | |
|---|---|
| *H01R 13/59* | (2006.01) |
| *H01R 13/622* | (2006.01) |
| *H01R 13/58* | (2006.01) |
| *H01R 13/52* | (2006.01) |

(52) U.S. Cl.
CPC ......... *H01R 13/59* (2013.01); *H01R 13/5816* (2013.01); *H01R 13/622* (2013.01); *H01R 13/5221* (2013.01)

(58) Field of Classification Search
None
See application file for complete search history.

(56) References Cited

U.S. PATENT DOCUMENTS

| | | | |
|---|---|---|---|
| 7,452,245 B2 | 11/2008 | Bolouri-Saransar et al. | |
| 7,476,120 B2 | 1/2009 | Ducharme et al. | |
| 9,520,692 B2 | 12/2016 | Fransen et al. | |

*Primary Examiner* — Ross N Gushi
(74) *Attorney, Agent, or Firm* — Christopher S. Clancy; James H. Williams; Christopher K. Marlow

(57) ABSTRACT

A strain relief system for a cable inserted within has a main housing with an opening and a series of ramp features and a series of serrations on an interior surface. The system also has a rotating collar with an opening in line with the opening of the main housing. The rotating collar having a series of follower features configured to be inserted into the opening of the main housing such that when the rotating collar is rotated relative to the main housing, the follower features engage the ramp features to compress the cable inserted with the strain relief system. The rotating collar also having at least one ratcheting tab configured to engage the series of serrations of the main housing such has to provide a ratcheting function between the rotating collar and the outer housing.

6 Claims, 32 Drawing Sheets

FIELD TERMINABLE CABLE AND PLUG ASSEMBLY

CROSS REFERENCE TO RELATED APPLICATIONS

This application claims priority to U.S. Provisional Patent Application No. 63/031,868, filed on May 29, 2020 and U.S. Provisional Patent Application No. 63/066,430, filed on Aug. 17, 2020, the entirety of which is hereby incorporated by reference herein.

BACKGROUND

Field terminable cable assemblies allow the installer to create custom length cables for their specific installation to eliminate the need for slack management and simplify the ordering process. With the field terminable connector, the installer can order a bulk spool of cable and the appropriate number of connectors rather than having to determine which pre-terminated patch cord part numbers are required, which can become complicated for both the customer and the distributor. While versatile, the current offerings and their shielded counterparts are larger than a standard RJ45 plug, and therefore cannot fit in some applications, such as security cameras and wireless access points. These applications would benefit from the ability to field terminate a standard sized copper plug onto bulk cable to fit into the device port.

Additionally, cable connectors require a method of mechanically securing the cable to the cable entry area of the connector. This is needed to prevent the cable from being pulled out of the connector and/or damaging the internal connector components when a pulling force is exerted on the cable. Securing the cable to the connector is typically achieved with a linear clamping mechanism. This design is suitable for connectors having a square profile that are large enough to house such a mechanism, but the design is not ideal for cylindrical connectors that are too compact to use this method of cable strain relief. These prior art systems also usually require the use of a special tool to crimp down onto the cable jacket. What is needed is an integral strain relief that fits in a compact cylindrical connector, can accommodate a range of cable diameters, and can be operated by hand without tools.

There is a market need for a product that allows for field termination of a copper plug that is compact enough to fit within remote devices that the current field terminable plug cannot support due to its size.

SUMMARY

A strain relief system for a cable inserted within has a main housing with an opening and a series of ramp features and a series of serrations on an interior surface. The system also has a rotating collar with an opening in line with the opening of the main housing. The rotating collar having a series of follower features configured to be inserted into the opening of the main housing such that when the roating collar is rotated relative to the main housing, the follower features engage the ramp features to compress the cable inserted with the strain relief system. The rotating collar also having at least one ratcheting tab configured to engage the series of serrations of the main housing such has to provide a ratcheting function between the rotating collar and the outer housing.

DESCRIPTION OF THE INVENTION

One part of The present invention is a field terminable copper plug/cable assembly that features a standard size RJ45 plug, a short length of cable, and field terminable splice module that allows for installation onto bulk copper cable.

Figure 1:
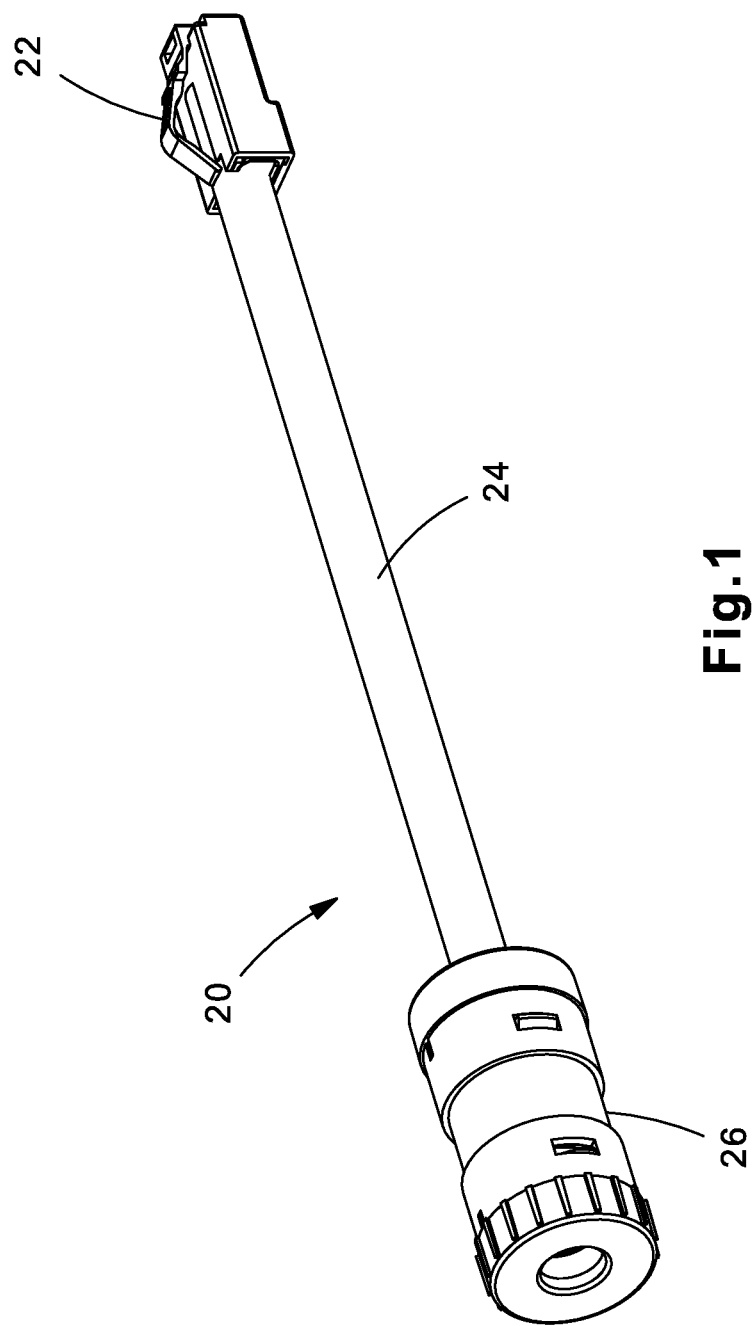
FIG. 1 is an isometric view of a plug/cable assembly.

FIG. 1 shows an plug/cable assembly 20 having a standard size RJ45 plug 22, cable section 24, and splice module 26. A standard size RJ45 plug 22 allows for installation into remote devices that a standard field-terminable plug cannot fit. A cable section 24 with standard 4 pair ethernet cable and may be offered in various lengths depending on application. A splice module 26 allows the installer to connect existing 4 pair ethernet cable to the plug/cable assembly on site using only a standard TG jack termination tool.

Figure 2:
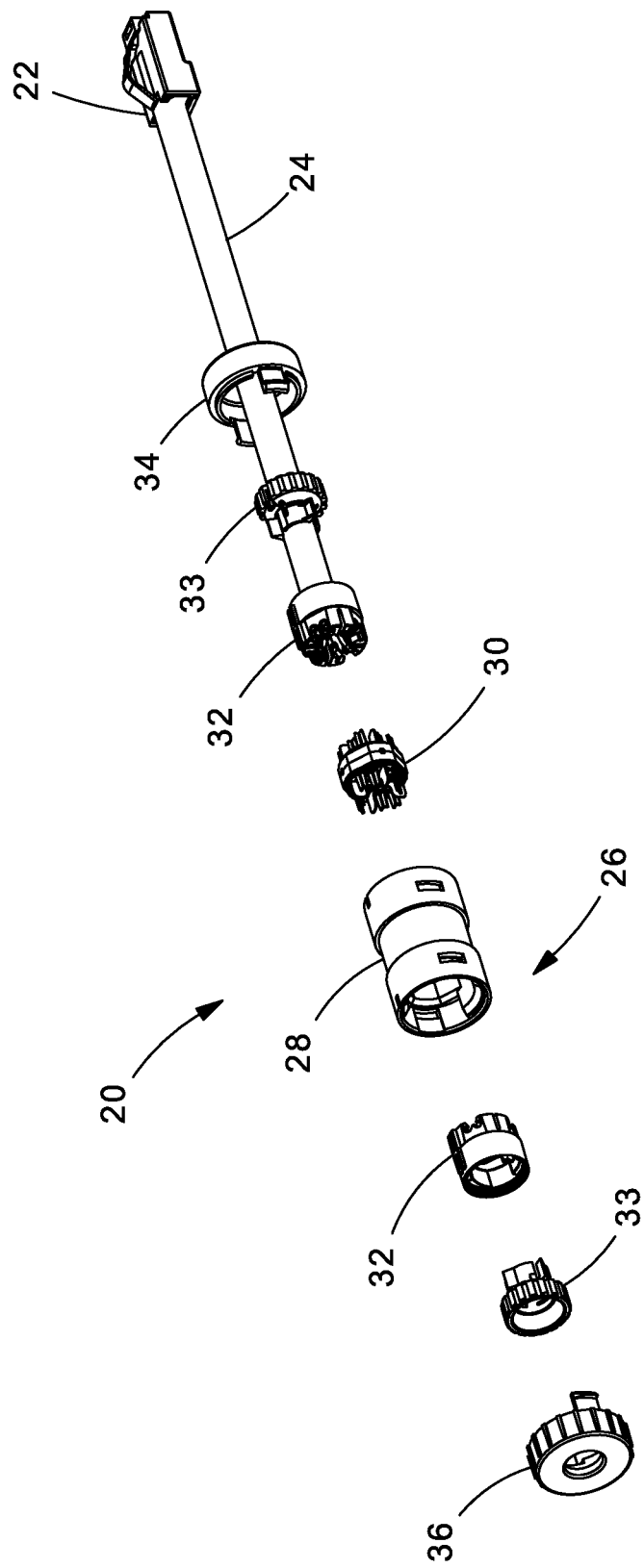
FIG. 2 is an exploded isometric view of the plug/cable assembly of FIG. 1.
Figure 3:
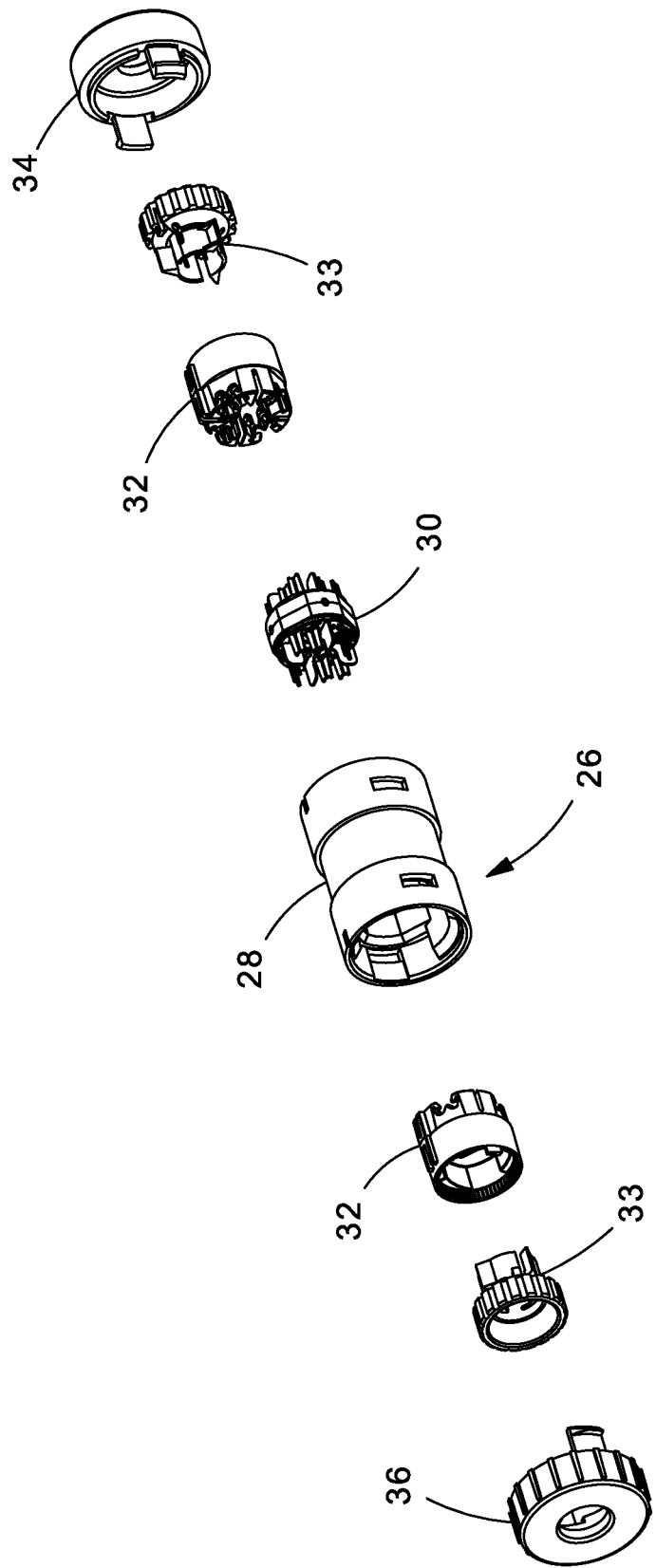
FIG. 3 is an exploded isometric view of the splice module of FIG. 1.

FIG. 2 and FIG. 3 show an exploded view of the plug/cable assembly 20 with a splice module 26. The splice module 26 has an outer barrel 28, contact assembly 30, wire caps 32, strain relief collars 33, a factory termination endcap 34, and a user termination endcap 36. The design intent is for one side of the splice module 26 to be sold with the cable section 24 already installed into one end. The factory termination endcap 34 will feature a tamper resistant design so that it cannot be removed by the user, while the other end will have a quick installation/uninstallation design for the installer to be able to quickly attach and unattach to existing horizontal cable.

Figure 4:
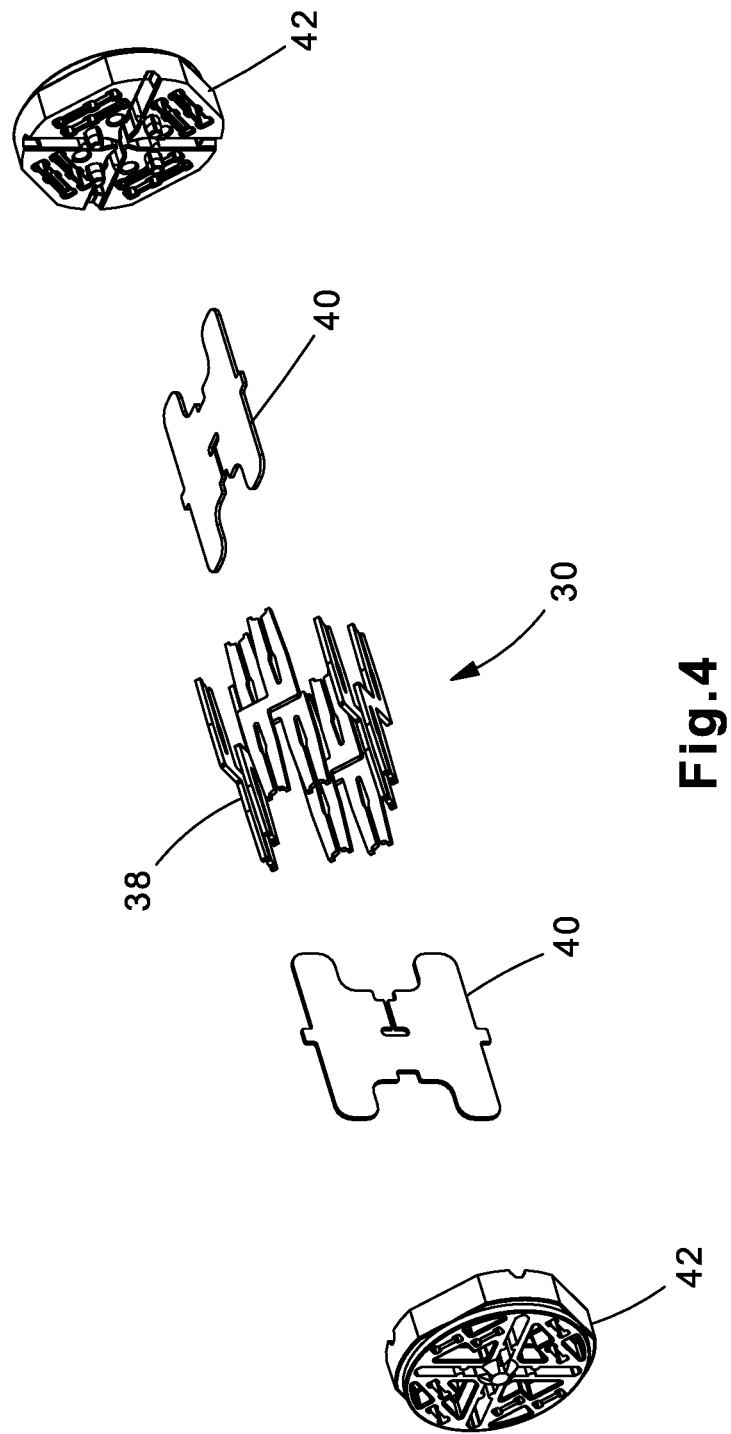
FIG. 4 is an exploded isometric view of the contact holder assembly of the splice module of FIG. 3.

FIG. 4 shows an exploded view of the contact assembly 30 having contacts 38, shield plates 40, and contact retainers 42. The contacts 38 are arranged in a cylindrical pattern, with each quadrant having a pair of contacts. The shield plates 40 are of metal construction and are intended to separate the quadrants of contact pairs to prevent crosstalk between the pairs. The contact retainers 42 position contacts 38 and shield plates 40 within the splice module outer barrel 28 while also acting as electrical insulators to prevent hipot related performance issues.

Figure 5:
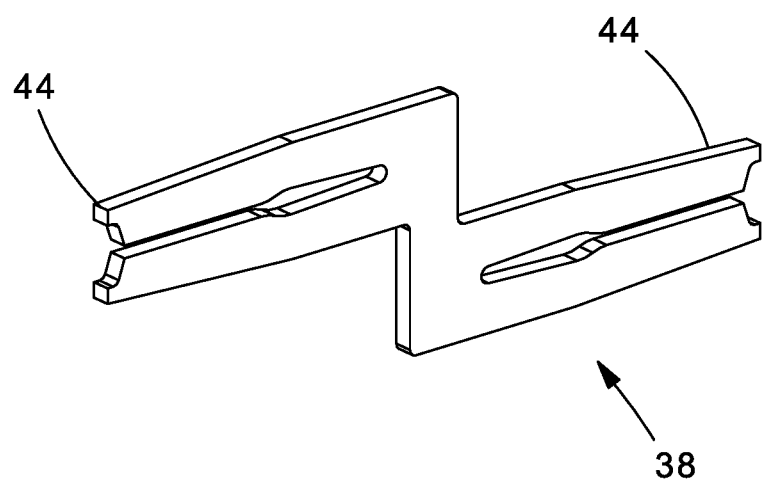
FIG. 5 is an isometric view of a contact from the contact holder assembly of FIG. 4.

FIG. 5 shows a detailed view of a contact 38 having opposing offset insulation displacement features 44 based on the existing TG jack insulation displacement contact geometry.

Figure 6:
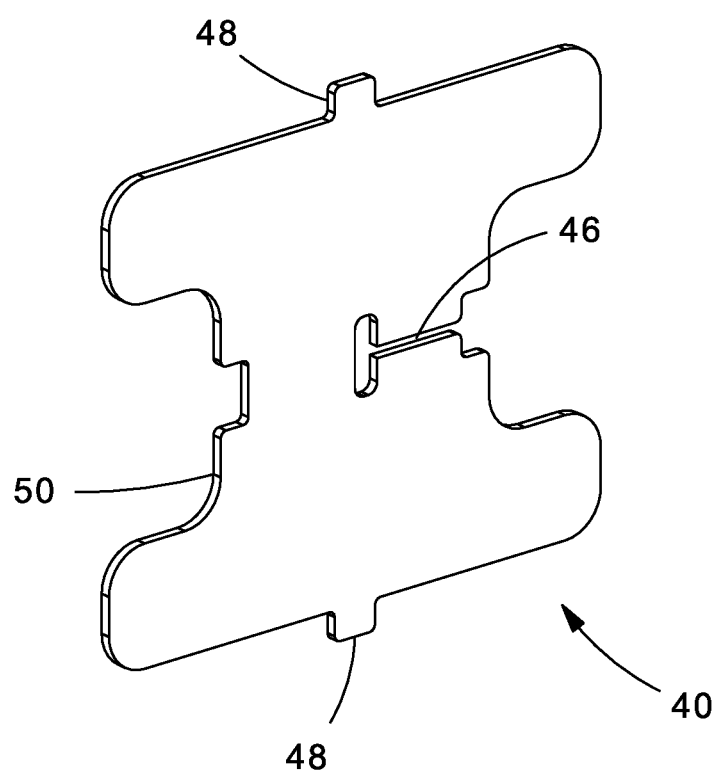
FIG. 6 is an isometric view of a shield plate from the contact holder assembly of FIG. 3.

FIG. 6 shows a detailed view of the shield plate 40. Longitudinal slots 46 allow two shield plates 40 to be mated to each other in a crossed arrangement. Tabs 48 are held by features of the contact retainers 42 to secure the plates within contact assembly 30. Notches 50 provide clearance for cable conductors to crossover within the splice module while reducing the risk of unintentionally cutting into the conductor insulation.

Figure 7:
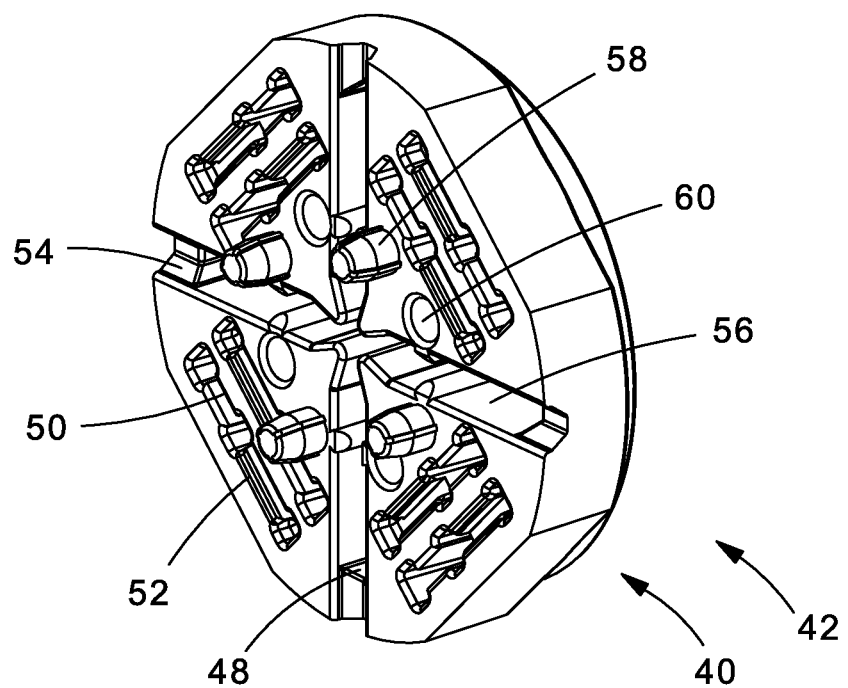
FIG. 7 is an isometric of the contact retainer of the contact holder assembly of FIG. 3.

FIG. 7 shows the inner features of the contact retainer 42. Contacts 38 are placed into contact pockets 52, with the flat portion of the offset contact seated onto the ledge of the contact pocket 52, with the insulation displacement feature 44 passing through the open portion of the contact pocket 52. Notches 54 accept the tabs 48 of the shield plates 40, while crossed openings 56 allow the plates to pass through the retainer. Once the contacts and plates are placed into the retainer half, another retainer half is placed over the assembly such that the posts 58 form an interference fit with holes 60 to hold the entire contact assembly together.

Figure 8:
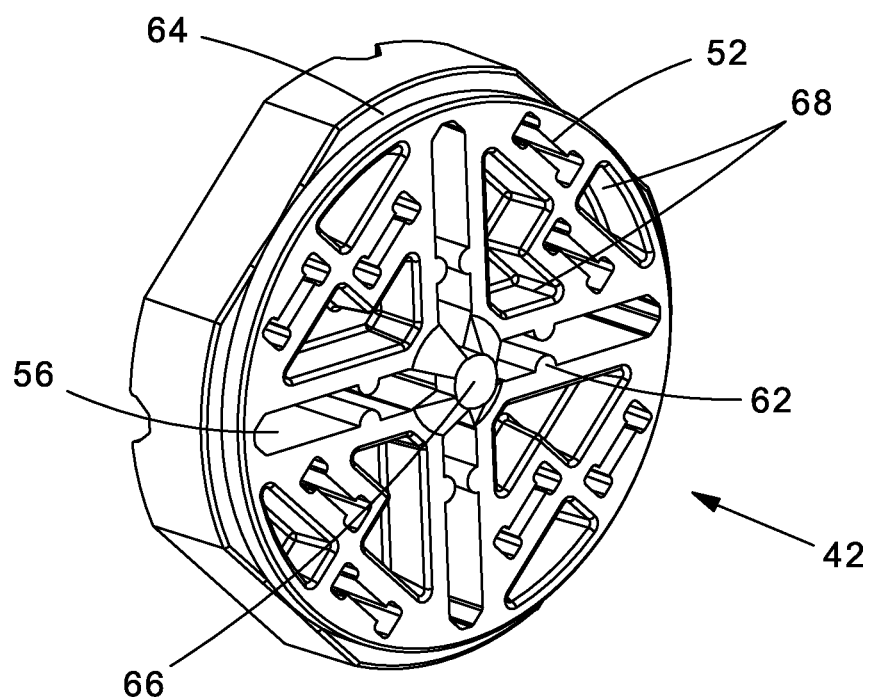
FIG. 8 is an isometric of the contact retainer of the contact holder assembly of FIG. 3.

FIG. 8 shows the outer features of the contact retainer 42. In this view, the portion of the contact pockets 52 that allow insulation displacement features 44 to extend can be seen. Crossed openings 56 have ribs 62 to help position shield plates 40. Perimeter notch 64 fits against a rib feature within outer barrel 28 to retain the contact assembly in the center of the barrel. Center button 66 provides structural rigidity to the contact retainer half and aids in material flow during molding. Cavity features 68 reduce material shrinkage immediately after the molding process.

Figure 9:
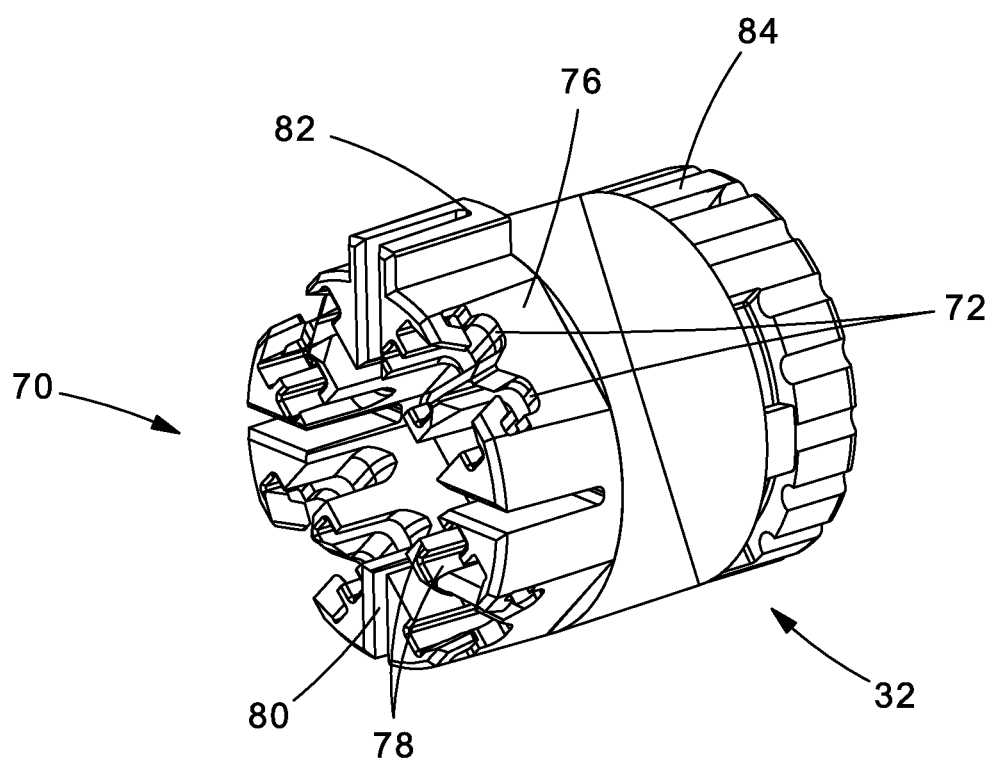
FIG. 9 is an isometric view of the wire cap assembly of the plug/cable assembly of FIG. 1 without the conductors in the wire cap.
Figure 10:
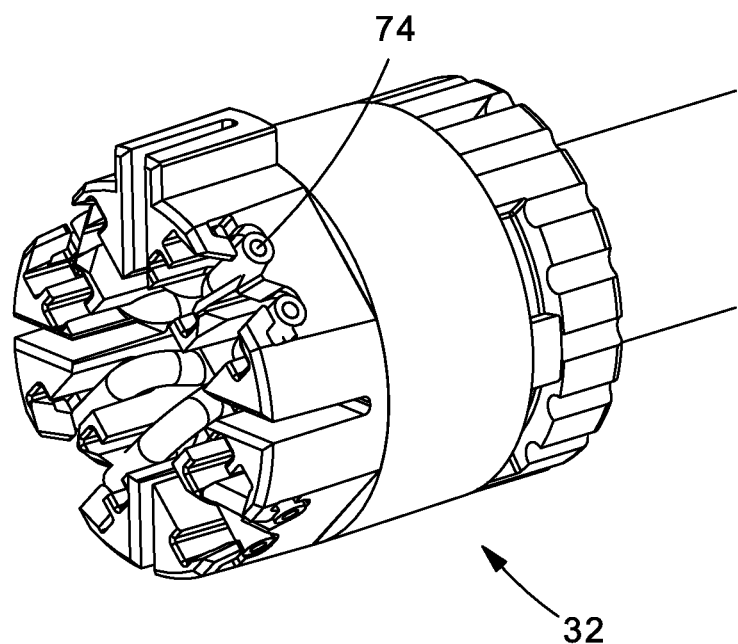
FIG. 10 is an isometric view of the wire cap assembly of the plug/cable assembly of FIG. 1 with the conductors in the wire cap

FIG. 9 and FIG. 10 show a detailed view of the wire cap 32 having a front termination area 70 that includes conductor retaining features 72. The user inserts the conductors 74 of user cable through the center of wire cap 32, inserts each conductor into the corresponding retaining feature 72, and trims the conductor flush with the outer surface 76. Contact pockets 78 and shield plate pockets 80 allow clearance for the contacts 38 and shield plates 40 as the wire cap is installed into the splice module. A keying feature 82 corresponds with a feature in the outer barrel 28 of the splice module 26 to only allow the wire cap to be installed in a specific orientation to maintain polarity between the factory cable section and the end user cable section. A rotational cam strain relief feature 84 (described in detail below) helps support end of cable jacket while also providing a surface for the user termination endcap 36 to drive the wire cap into the outer barrel 28.

Figure 11:
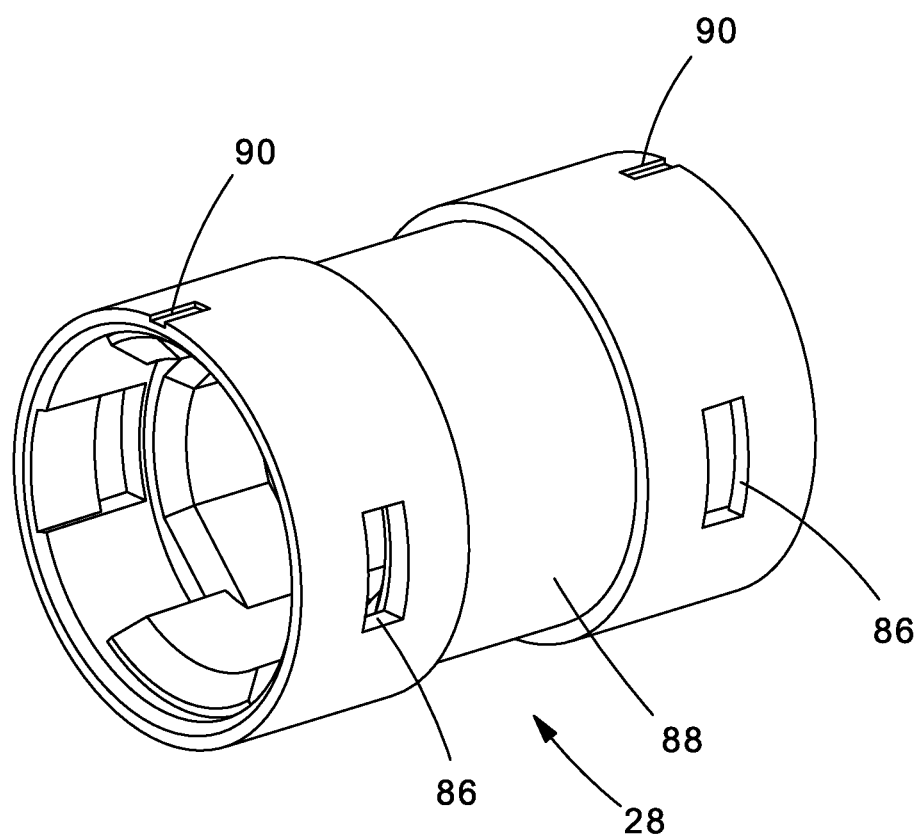
FIG. 11 is an isometric view of the outer barrel of the splice module of FIG. 3.

FIG. 11 shows a detailed view of the outer barrel 28. Pockets 86 engage with the latch features of the endcaps to lock them in place once they are fully inserted into the ends of the barrel. A center notch 88 provides a location for using cable ties to secure the splice module in place. Alignment marks 90 aid in positioning the keying feature 82 of the wire cap 32 prior to insertion into the outer barrel 28.

Figure 12:
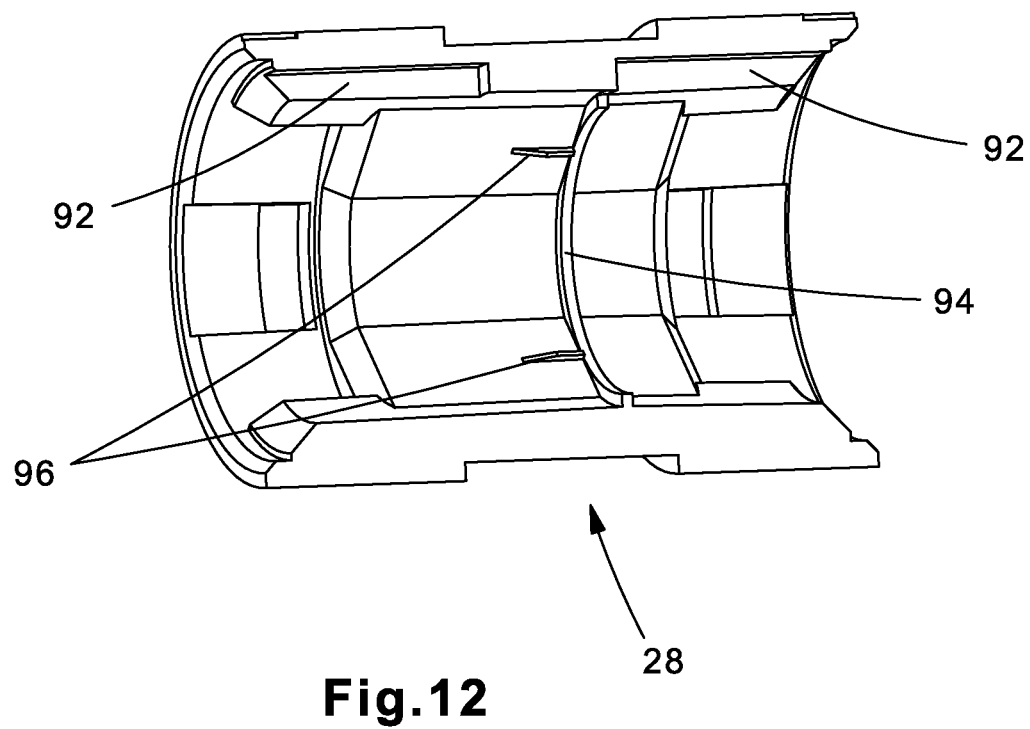
FIG. 12 is a sectioned view of the outer barrel of FIG. 11.

FIG. 12 shows a sectioned view of the outer barrel 28. The keyway 92 aligns with keying features 82 of the wire cap 32 to maintain signal polarity between the cable ends being connected together within the splice module. A ledge 94 locates the contact assembly 30 within the center of the outer barrel and fits in a perimeter notch 64 of the contact retainer 42. Ribs 96 are designed to form an interference fit with the contact assembly 30 to hold the assembly in place prior to the factory terminated end of the splice module being installed.

Figure 13:
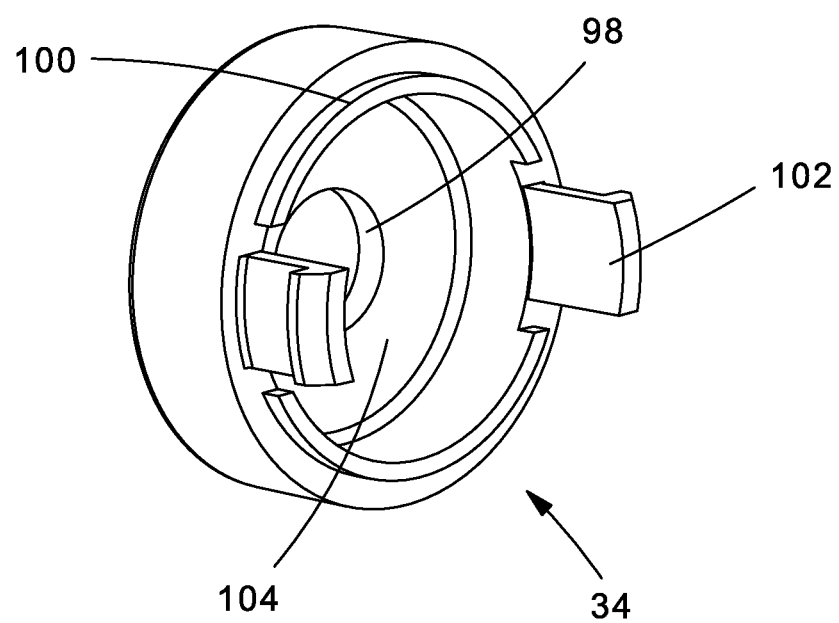
FIG. 13 is an isometric view of the factory termination endcap of the splice module of FIG. 3.

FIG. 13 shows a detailed view of factory termination endcap 34. The factory termination endcap is intended to be tamper resistant and is permanently installed by the Panduit manufacturing location during assembly of cable section 24 to the plug end of the splice module. Cable section 24 is inserted through opening 98. Inner sleeve 100 fits inside outer barrel 28 and factory termination endcap latches 102 engage with pockets 86 of outer barrel 28. The inner face 104 pushes against the back of the strain relief feature 84 of the wire cap 32 to drive the wire cap into the outer barrel 28 as the factory termination endcap 34 is installed into the outer barrel 28.

Figure 14:
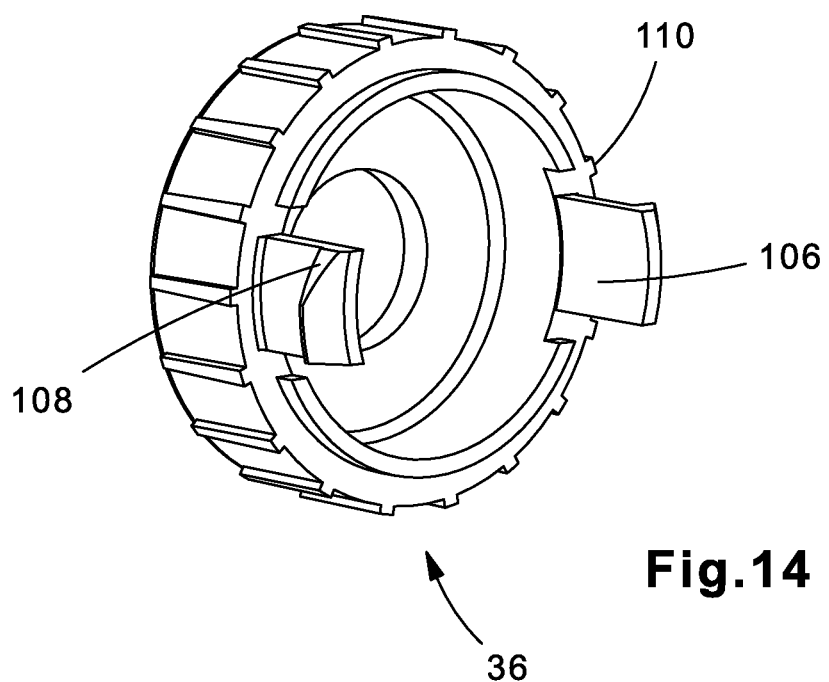
FIG. 14 is an isometric view of the user termination endcap of FIG. 3.

FIG. 14 shows a detailed view of a user termination endcap 36. Unlike the factory termination endcap 34, the user termination endcap is designed to be installed and uninstalled by the user to allow termination and untermination of existing horizontal ethernet cable. User termination endcap latches 106 snap into pockets 86 of the outer barrel 28 similar to factory termination endcap latches 102 of the factory termination endcap 34, however the user termination endcap latches 106 have ramp features 108 that cause the latches to disengage from the outer barrel pockets 86 when the endcap is rotated counter-clockwise. Grip features 110 allow the user to rotate the endcap for removal.

Figure 15:
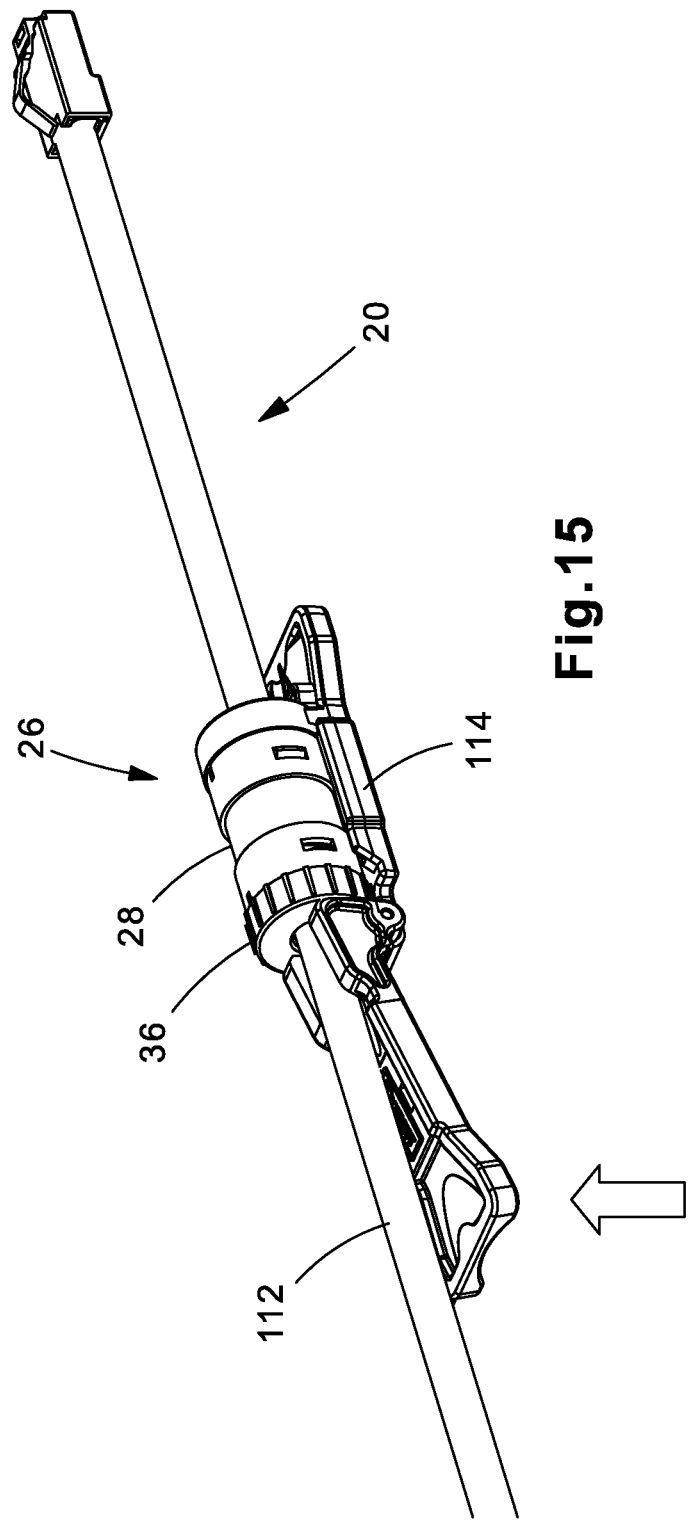
FIG. 15 shows a jack termination tool being used to help terminate the plug/cable assembly of FIG. 1.

FIG. 15 shows that a TG jack termination tool may be used to aid termination of the customer horizontal cable 112 onto the indoor field cord assembly 20. The splice module 26 is placed in the TG jack termination tool 114. With the user termination endcap 36 driven into the outer barrel 28 as far as can be easily done by hand, the TG jack termination tool 114 provides additional leverage to drive the user termination endcap 36 fully into outer barrel 28, which in turn drives the cable conductors into the insulation displacement contacts and completing the termination process.

The splice module may utilize insulation displacement contacts having staggered lengths in order to reduce the force required to insert the cable conductors into the contacts. By staggering the contact lengths, the number of cable conductors being simultaneously pierced by the contacts at a given travel distance of the wire cap is reduced.

Figure 16:
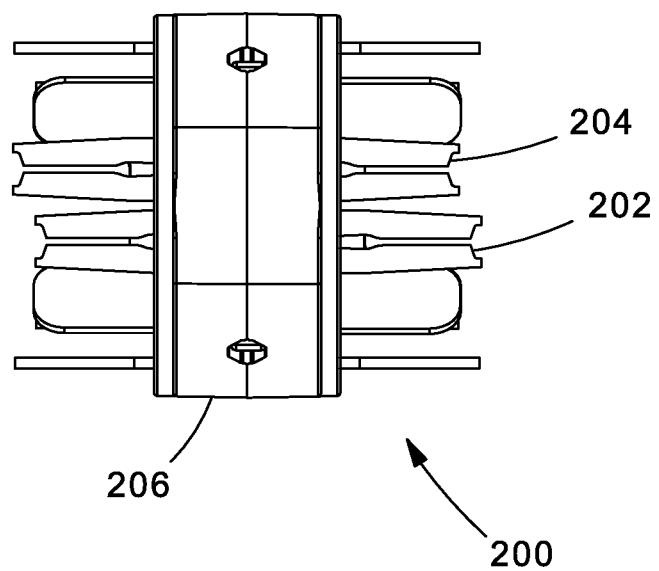
FIG. 16 shows an alternate contact holder assembly in which the lengths of contacts are staggered.

FIG. 16 shows a side view of a staggered contact assembly 200. A plurality of long contacts 202 and short contacts 204 are arranged into the contact holder 206.

Figure 17:
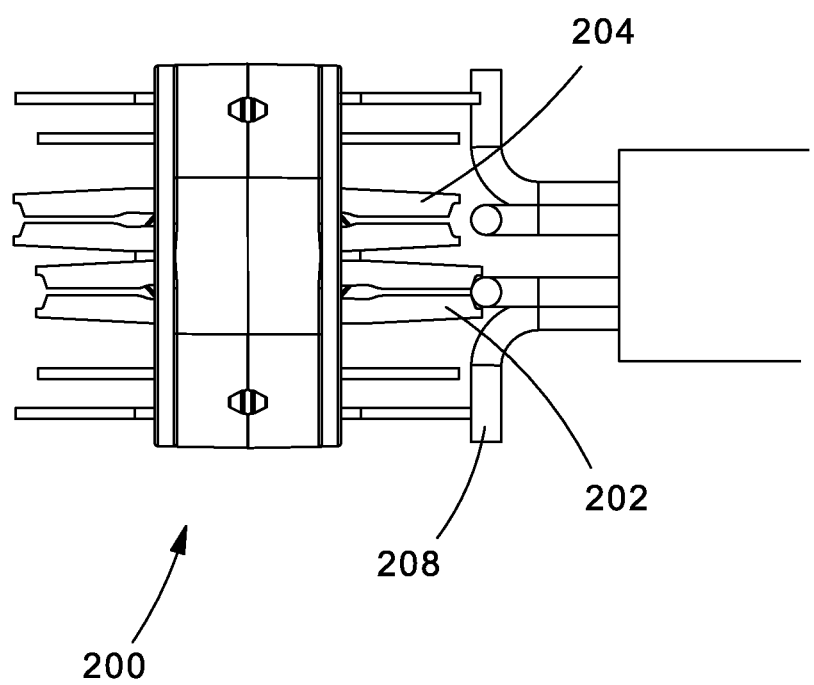
FIG. 17 shows the alternate contact holder of FIG. 16 with the conductors being terminated to the contacts.

FIG. 17 shows cable conductors 208 arranged within a wire cap (not shown) prior to being pushed into staggered contact assembly 200. Cable conductors 208 are pierced by long contacts 202 prior to being pierced by short contacts 204 as the conductors are pushed into the contacts. This staggered arrangement results in a lower required force to pierce the conductor insulation as opposed to piercing all of the cable conductors simultaneously.

The present invention is a cable strain relief mechanism designed for use in a cylindrical connector. The strain relief can support a range of cable diameters and can be operated without the use of tools.

Figure 18:
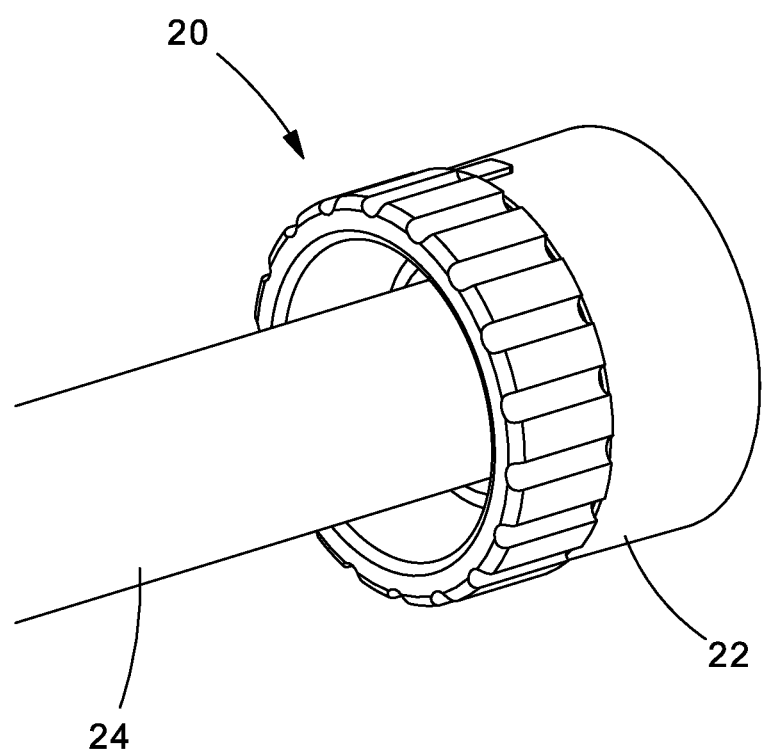
FIG. 18 is an isometric view of the strain relief assembly of the splice module of FIG. 3.

FIG. 18 shows a strain relief system 20 having a rotational cam cable strain relief 22 and cable 24. Strain relief system 20 may be integral to a cable connector housing or internal component such as a wire cap. Cable 24 is inserted through the center of rotational cam cable strain relief 22 and is secured inside once the rotational cam cable strain relief 22 is actuated.

Figure 19:
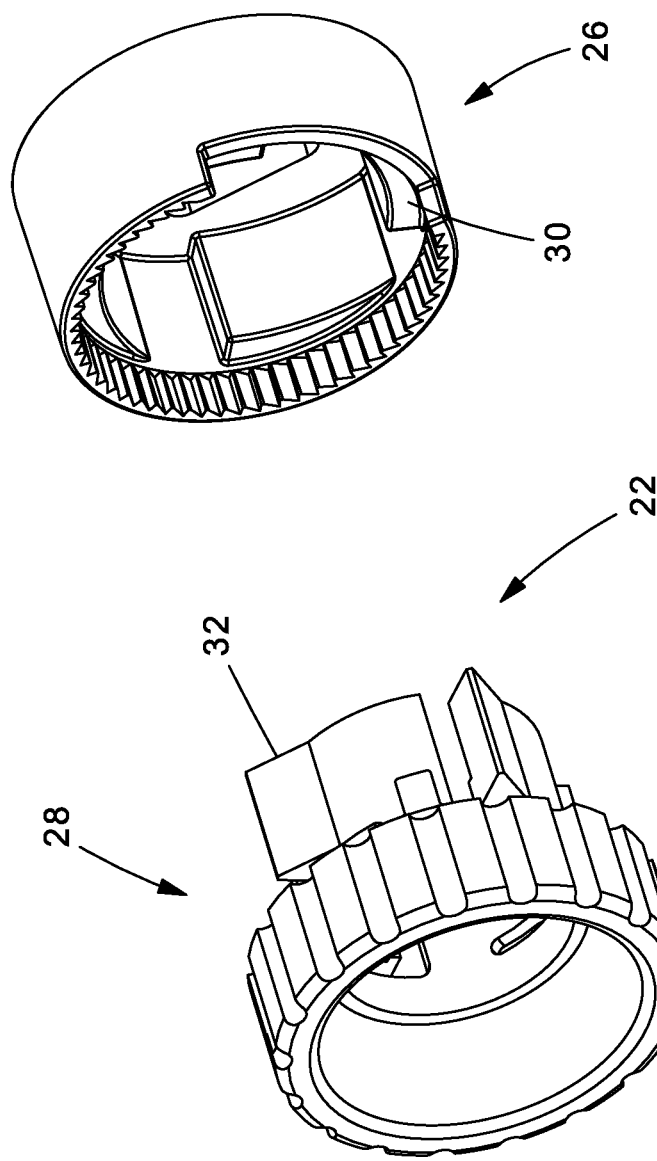
FIG. 19 is an exploded isometric view of the strain relief assembly of FIG. 18.

FIG. 19 shows an exploded view of rotational cam cable strain relief 22 having a stationary main housing 26 and a rotating collar 28. Rotating collar 28 inserts into stationary main housing 26 and is rotated inside stationary main housing 26 to tighten around the cable to provide strain relief. The operating principle of the mechanism is based on a cam system. The stationary main housing 26 has a plurality of ramp features 30. Follower features 32 on the rotating collar 28 ride on the ramp features 30, forcing the follower features inward towards the center axis of the rotating collar 28 and in turn gripping onto the cable jacket as the rotating collar 28 is turned clockwise.

Figure 20:
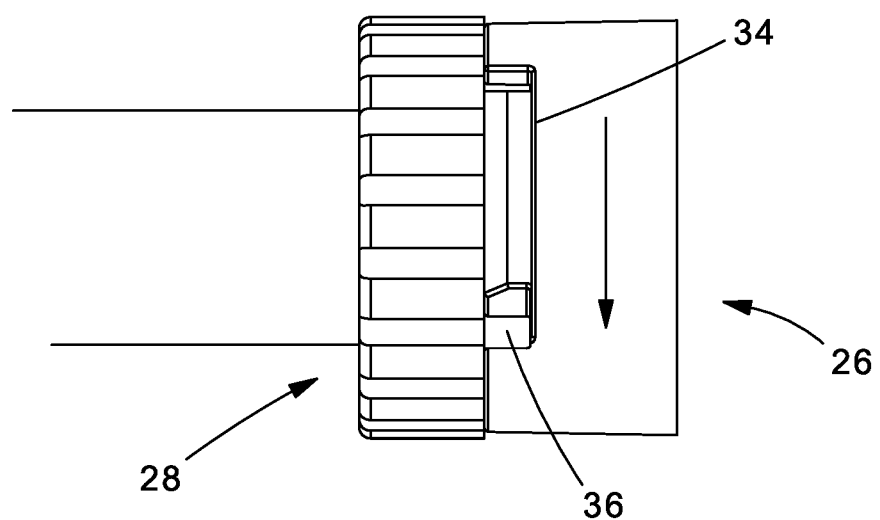
FIG. 20 is a side view of the strain relief assembly of FIG. 18.

FIG. 20 shows that the stationary main housing 26 has a keyway 34 into which the key 36 of the rotating collar 28 fits, limiting the rotation of the collar to prevent the follower features 32 from falling off of the ramp features 30 as the collar approaches maximum engagement. The figure shows a side view of the key 36 in the fully rotated position within keyway 34.

Figure 21:
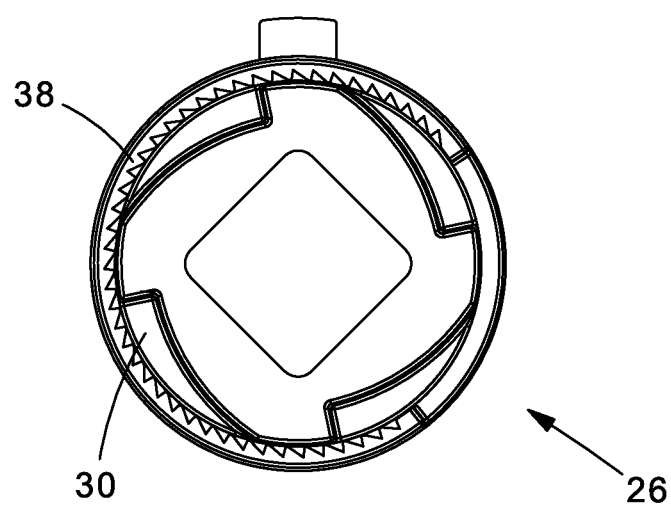
FIG. 21 is a back view of the stationary main housing of the strain relief assembly of FIG. 18.

FIG. 21 provides a view looking directly into the back of stationary main housing 26. Ramp features 30 are arranged about the inner diameter of the housing in a circular array. A series of serrations 38 are located along the edge of stationary main housing 26. Serrations 38 engage with a feature on the rotating collar 28 to create a ratcheting mechanism, preventing the rotating collar 28 from turning counterclockwise and thus loosening around the cable jacket. For retermination purposes, the rotating collar 28 can be pulled straight back out of the stationary main housing 26 to release the strain relief.

Figure 22:
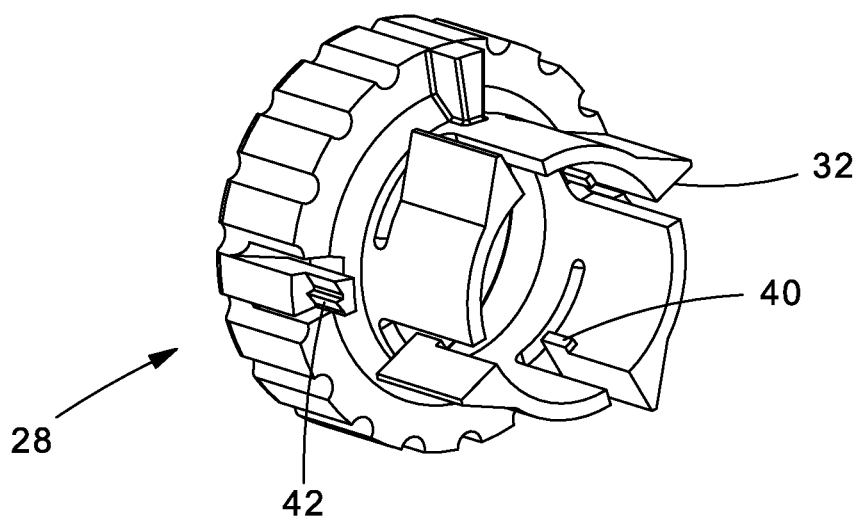
FIG. 22 is an isometric view of the rotating collar of the strain relief assembly of FIG. 18.

FIG. 22 shows the features of the rotating collar 28 that interact with the features of stationary main housing 26 as described in the previous paragraph. The follower features 32 are arranged in a similar circular pattern to the ramp features 30 of the stationary main housing 26, allowing all four followers to be simultaneously depressed inward towards the center of the collar to grip the cable jacket. Rectangular pads 40 located on the inside of the follower features 32 are intended to bite into the cable jacket as the strain relief system is tightened, preventing the cable from slipping and rotating within the rotating collar 28. Ratcheting tabs 42 engage with serrations 38 of the stationary main housing 26 to allow the collar to only turn in one direction.

Figure 23:
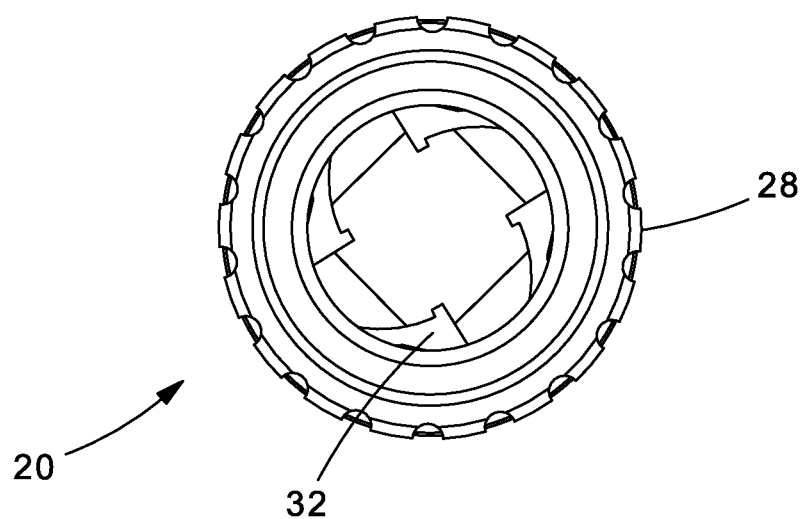
FIG. 23 is a view of the strain relief assembly of FIG. 18 with the rotating collar in the position of maximum engagement such that the follower features are fully depressed inward.

FIG. 23 shows the strain relief system 20 with the rotating collar 28 in the position of maximum engagement such that the follower features 32 are fully depressed inward. The amount of engagement varies depending on how far the collar is rotated clockwise, allowing the strain relief system to be compatible with a range of cable diameters.

The strain relief system may use various methods for limiting the amount of rotation of the rotating collar within the stationary main housing. This includes reversing the arrangement of the key to the keyway so that the key is located on the stationary main housing while the keyway is on the rotating collar. The number of key/keyway features may also vary in order to make the insertion of the rotating collar into the stationary main housing easier.

Figure 24:
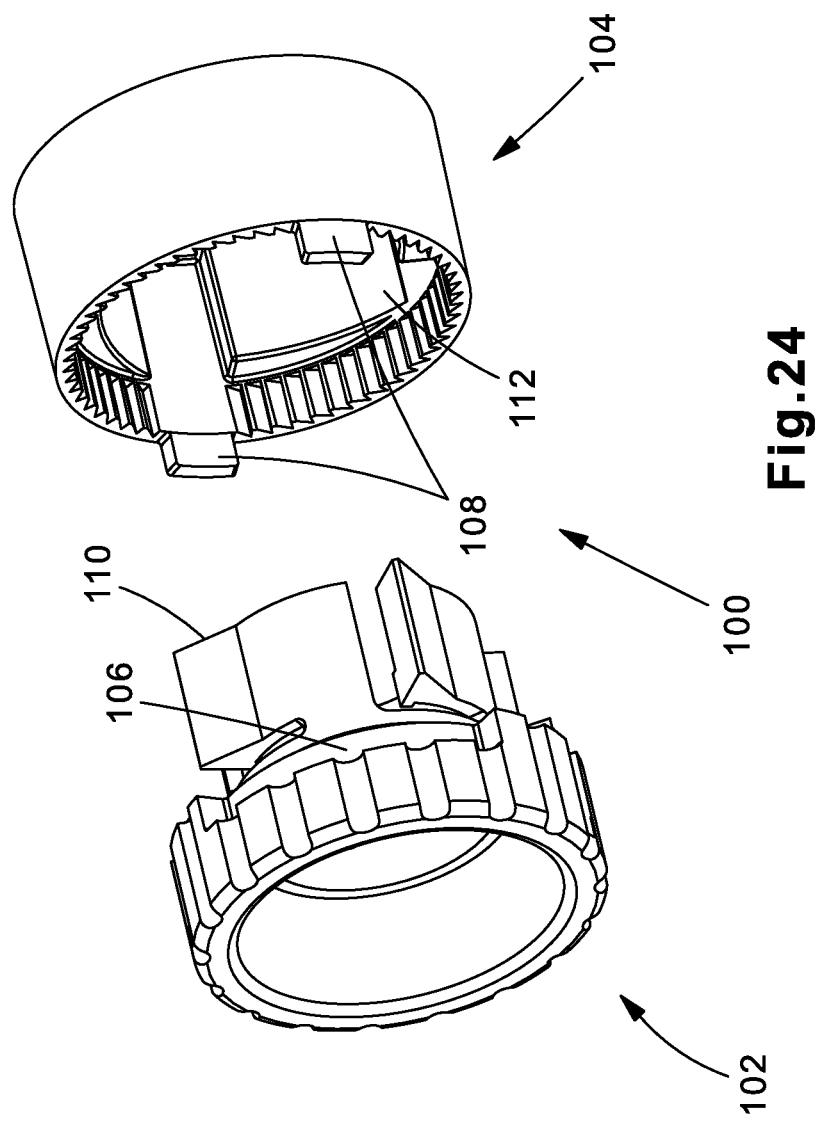
FIG. 24 is an isometric view of an alternate method of limiting the trace of the rotating collar.

FIG. 24 shows strain relief system 100 with rotating collar 102 removed from stationary main housing 104. The rotating collar 102 has a keyway 106 that engages with keys 108 of stationary main housing 104. Note that stationary main housing 104 has two keys 108, consequently the rotating collar 102 has two keyways 106. The features function in the same way as described in FIG. 3 by limiting the maximum rotation of rotating collar 102 within stationary main housing 104. This prevents collar followers 110 from traveling off the end of ramp features 112 of stationary main housing 104.

Figure 25:
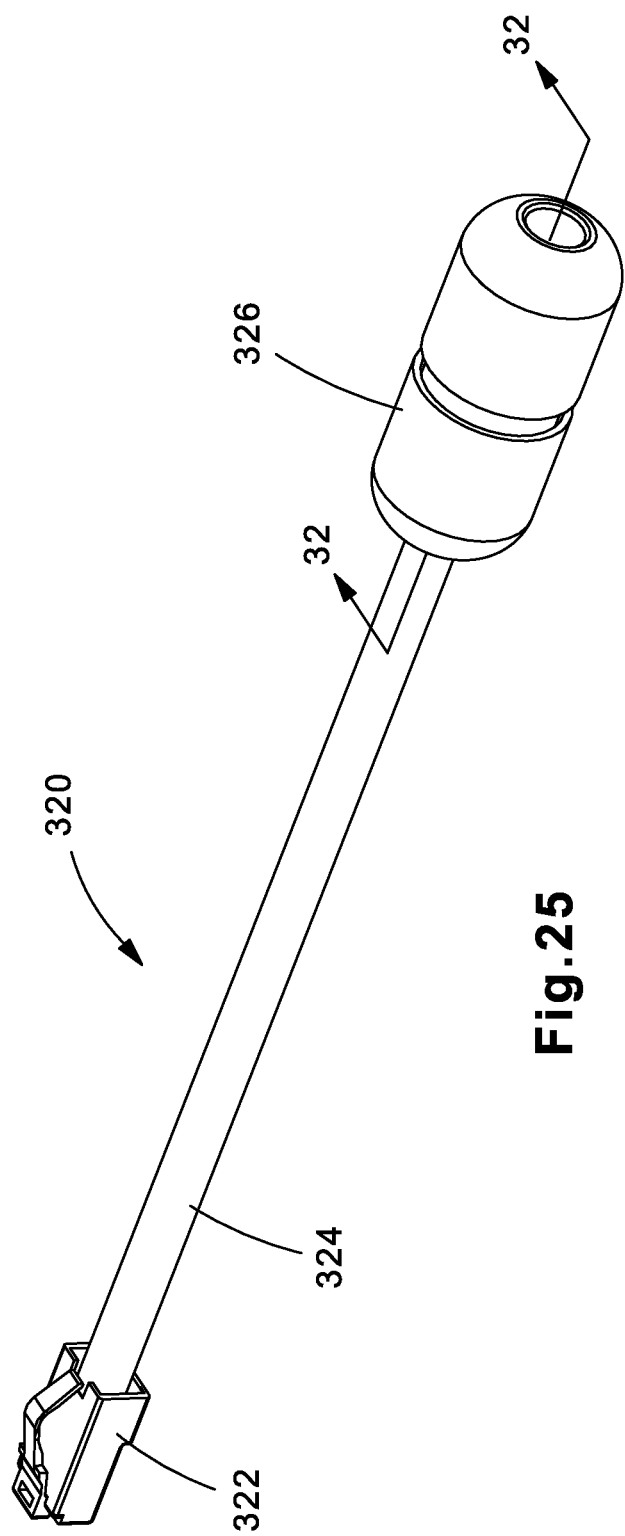
FIG. 25 is an isometric view of an outdoor shielded plug/cable assembly.

FIG. 25 shows an Outdoor Field Cord assembly 320 having a standard size shielded RJ45 plug 322, cable section 324, and splice module 326. Standard size shielded RJ45 plug 322 allows for installation into remote devices that the standard Field Term Plug cannot fit. Cable section 324 is standard 4 pair ethernet cable and may be offered in various lengths depending on application. Splice module 326 allows the installer to connect existing 4 pair ethernet cable to the Field Cord on site.

Figure 26:
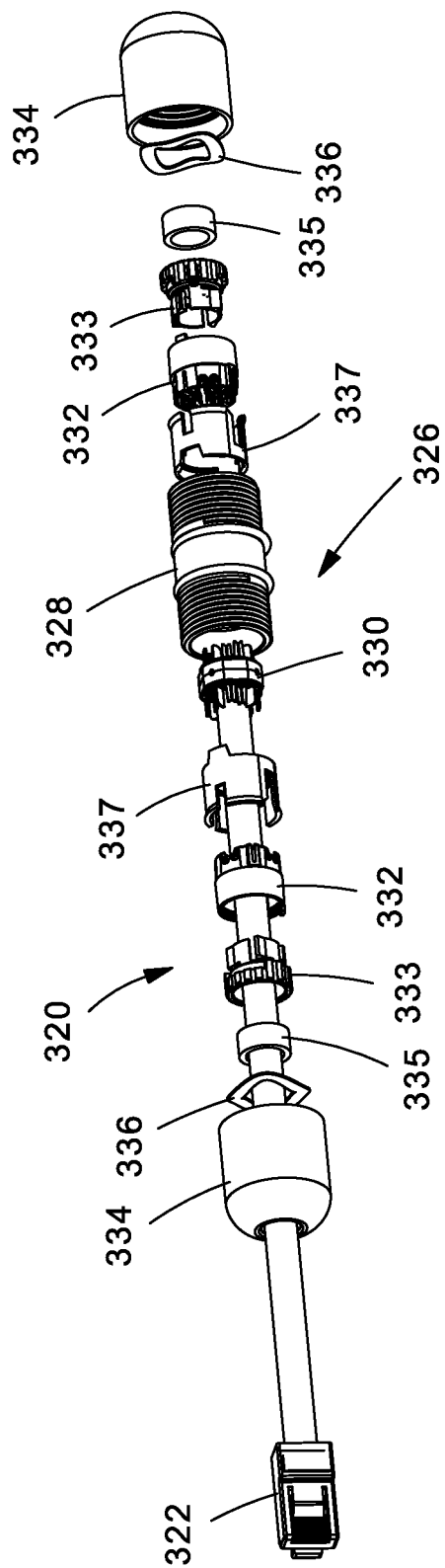
FIG. 26 is an exploded isometric view of the plug/cable assembly of FIG. 25.

FIG. 26 show Outdoor Field Cord assembly 320 with splice module 326 exploded. Splice module 326 includes a metal outer barrel 328, O-rings 349, contact assembly 330, wire caps 332, strain relief collars 333, threaded metal end caps 334, grounding wave washers 336, rubber cylindrical seals 335, and insulating barrels 337. The design intent is for one side of the splice module 326 to be sold with the cable section 324 already installed into one end. The product may also be sold as a splice module only.

Figure 27:
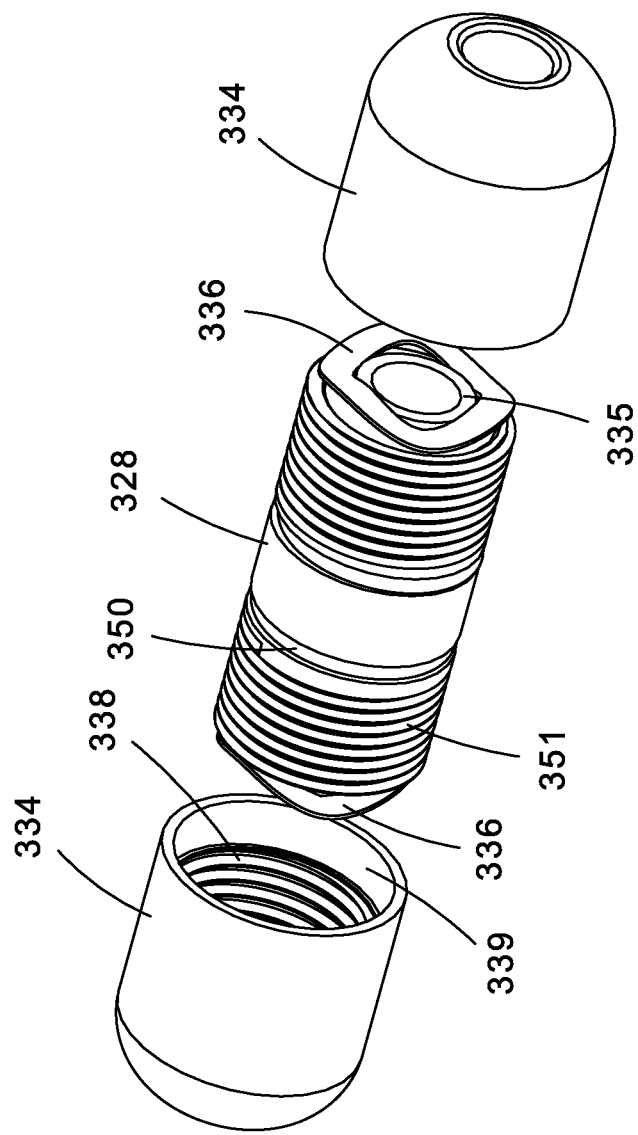
FIG. 27 is an exploded isometric view of the splice module of the plug/cable assembly of FIG. 25.

FIG. 27 shows the threaded features 38 on the metal end cap 334 as well as the threaded features 351 on the metal outer barrel 328. The O-ring groove 350 can also be seen on the metal outer barrel 328, holding the O-ring 349 in place (pictured later for clarity). The flat feature 339 on metal end cap 334 is used to seal against the O-ring 349 located in the O-ring groove 350 as the cap is threaded onto the metal outer barrel 328.

Figure 28:
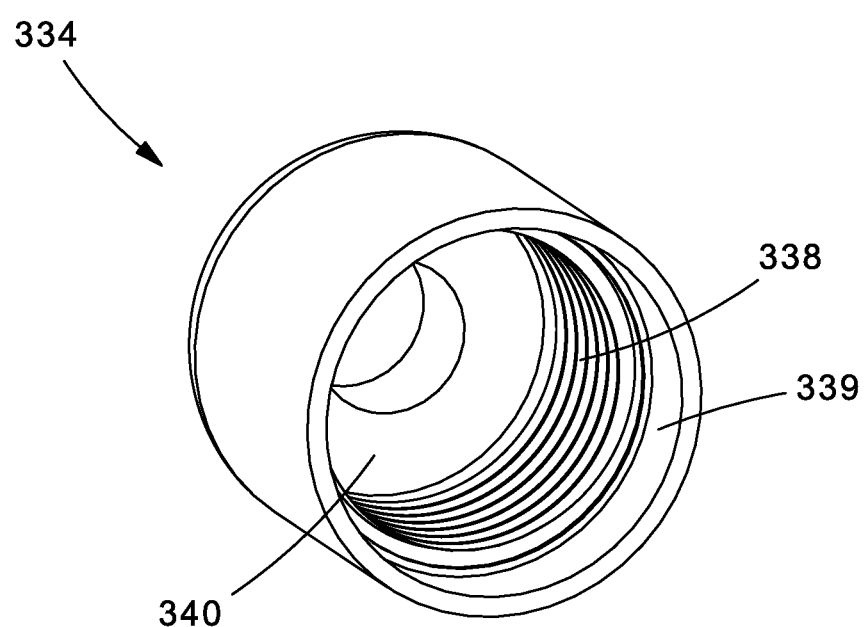
FIG. 28 is an isometric view of the end cap of the splice module of FIG. 27.

FIG. 28 provides a view of the inside of metal end cap 334. The flat feature on the end cap 340 is used to assist in sealing the cable by applying force against the rubber cylindrical seal 335.

Figure 29:
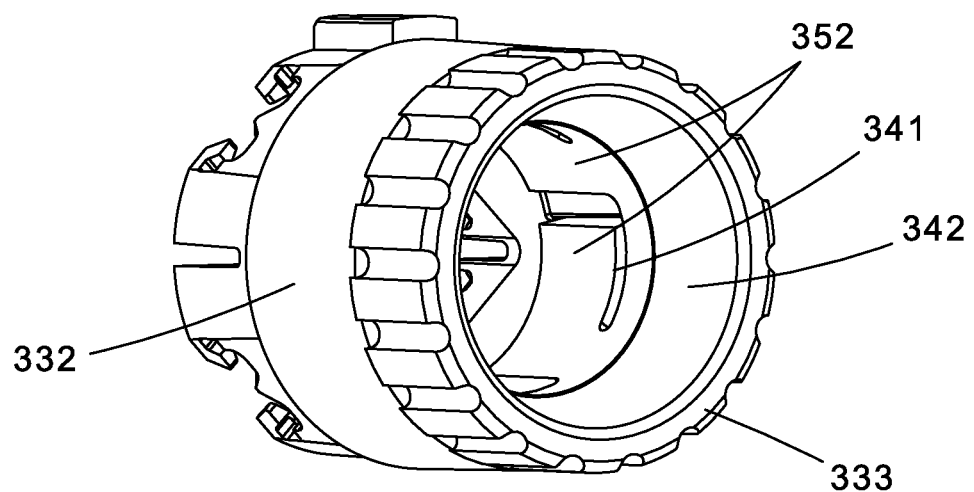
FIG. 29 is an isometric view of the wire cap of the splice module of FIG. 27.

FIG. 29 shows how the strain relief collar 333 inserts into the wire cap 332. For the outdoor version the strain relief also assists in shielding as it is to be nickel plated. The cut away feature 341 that allows for camming action is an indicator of how long the shielded cables braid must be pulled back. As the cam features close in when this part is rotated within the wire cap to engage the cable, the cam feature faces 352 contact the cable and the braid creating a grounding connection from the braid to the strain relief collar 333. The taper feature 342 is used to seal the rubber cylindrical seal 335 to the cable.

Figure 30:
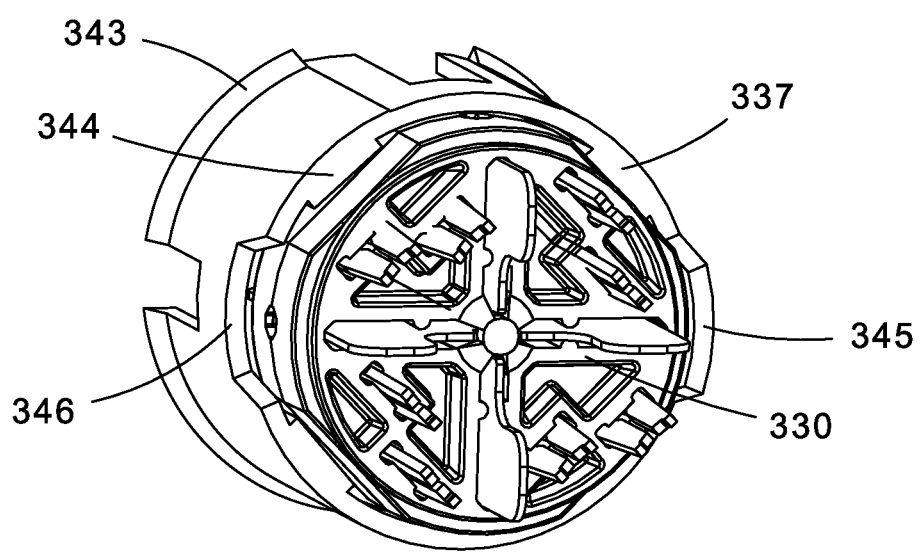
FIG. 30 is a isometric view of the insulation barrel of the splice module of of FIG. 27
Figure 31:
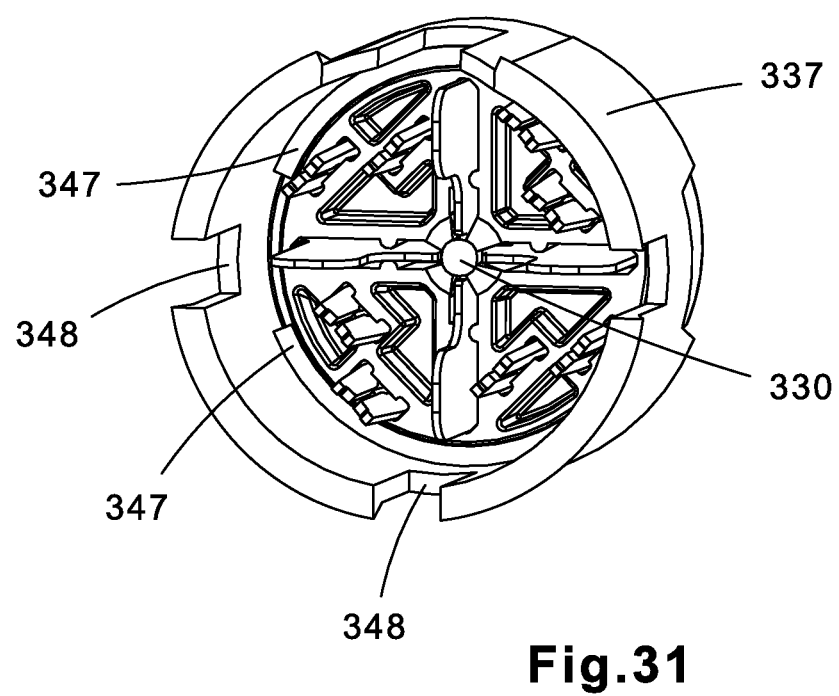
FIG. 31 is a isometric view of the insulation barrel of the splice module of of FIG. 27

FIG. 30 and FIG. 31 show a detailed view of the insulating barrel 337. The barrel is made up of two of the same insulating barrels 337 that are fitted together. They have two circular features 347 to hold the contact assembly 330 in place in the metal outer barrel 328. Once the insulating barrel 337 is pushed together inside of the metal outer barrel 328, the circular features 347 hold the contact assembly 330 in place so it does not float during termination. To stay in place in the metal outer barrel 328, the insulating barrel 337 includes a ramp feature 343 that snaps into place. The insulating barrel 337 includes three relief cut features 348 to allow deflection of the ramp features 343 inward during insertion into metal outer barrel 328. Square Feature 344 keeps the contact assembly 330 from turning axially once it is inserted into place. This allows for termination alignment. The tab 345 allows for the insulating barrels 337 to fit together as it slots into the cut out 346.

Figure 32:
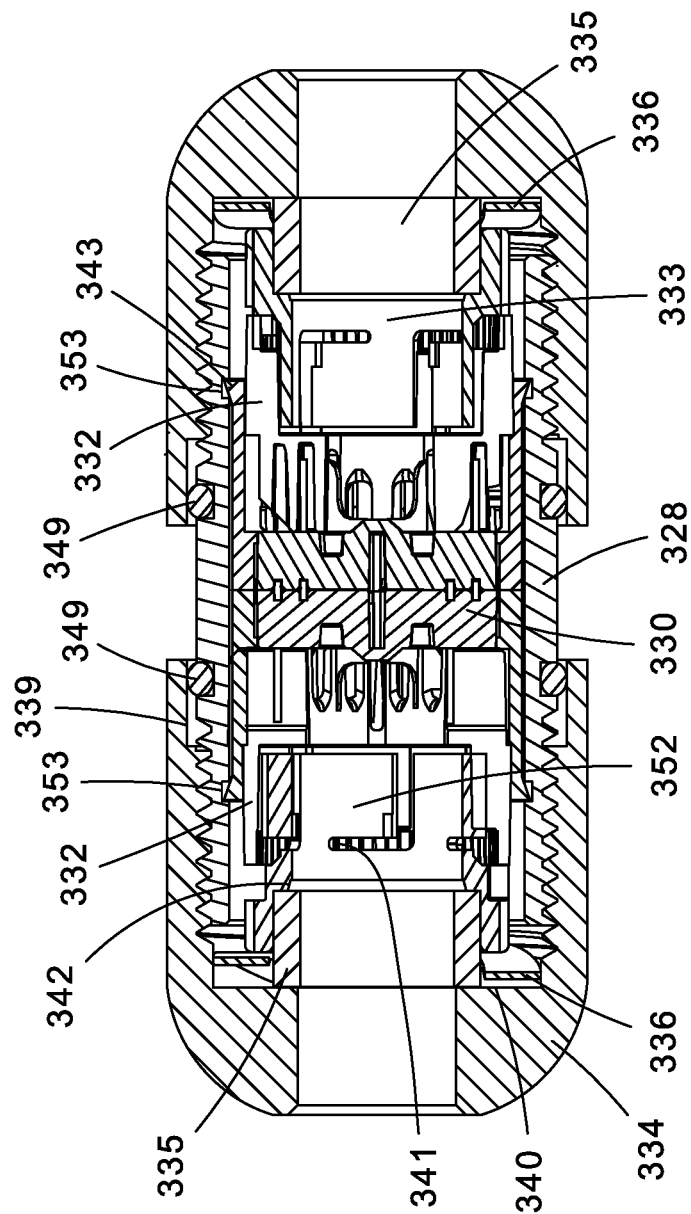
FIG. 32 is a cross-sectional view of the splice module of the plug/cable assembly of FIG. 25.

FIG. 32 provides a cut away view of the assembled splice module. The insulating barrels 337 can be seen completely formed, along with the snap grooves in the metal barrel 353 for holding the insulating barrels 337 in place with the ramp feature 343. The rubber cylindrical seals 335 can be seen being compressed by the strain relief collar 33 due to the taper feature 42. The compression of the rubber cylindrical seals 335 into the strain relief collar 333 into the wire cap 332 presses the conductors into the IDCs in the contact assembly 330 for termination. This compression comes from the metal end caps 334 as they are being threaded on to the metal outer barrel 328. The compression from the rubber cylindrical seal 335 to the back flat 340 of the metal end cap 334 creates an IP67 seal for the internal components of the splice. As the rubber cylindrical seal 335 gets compressed into the taper feature 342, it creates an IP67 seal against the cable. Overlap is shown in this photo to show the taper feature 342. As the flat feature 339 of the metal end cap 334 gets threaded over the O-ring 349, it creates a seal for the threads for an IP67 rating. The cable features a braid that must be pulled back even with the top of the cut away cam features 341 of the strain relief collar 333. This braid is grounded once the cam features faces 352 are engaged. The wave washer 336 makes contact with this nickel plated strain relief collar 333 and touches off on the back flat 340 of the metal end cap 334 completing the shielding from one cable to another, as this occurs on both sides of the splice.

The invention claimed is:

1. A strain relief system for a cable inserted within comprising:
 a main housing with an opening and having a series of ramp features and a series of serrations on an interior surface;
 a rotating collar with an opening in line with the opening of the main housing, the rotating collar having a series of follower features configured to be inserted into the opening of the main housing such that when the rotating collar is rotated relative to the main housing, the follower features engage the ramp features to compress the cable inserted with the strain relief system, the rotating collar also having at least one ratcheting tab configured to engage the series of serrations of the main housing such as to provide a ratcheting function between the rotating collar and the main housing.

2. The strain relief system of claim 1 wherein the follower features also have rectangular pads on an interior surface of the follower features configured to bite into the cable as the rotating collar is rotated relative to the outer housing.

3. The strain relief system of claim 1 further comprising a keyway on the main housing and a key on the rotating collar configured to limit an amount of rotation of the rotating collar to the main housing.

4. The strain relief system of claim 1 further comprising a keyway on the rotating collar and a key on the main housing configured to limit an amount of rotation of the rotating collar to the main housing.

5. A splice module comprising:
 an outer barrel;
 a contact assembly with insulation displacement contacts inserted within the outer barrel;
 first and second wire caps configured to be inserted into the outer barrel on opposite sides and retain a cable and individual conductors of the cable such as to have the conductors engage the insulation displacement contacts of the contact assembly wherein each wire cap has:
  a main housing with an opening and having a series of ramp features and a series of serrations on an interior surface;
  a rotating collar with an opening in line with the opening of the main housing, the rotating collar having a series of follower features configured to be inserted into the opening of the main housing such that when the rotating collar is rotated relative to the main housing, the follower features engage the ramp features to compress the cable inserted with the strain relief system, the rotating collar also having at least one ratcheting tab configured to engage the series of serrations of the main housing such as to provide a ratcheting function between the rotating collar and the outer housing.

6. The splice module of claim 5 wherein the outer barrel is composed of a metal and wherein the splice module has two metal endcaps configured to screw on over the ends of the outer barrel.

* * * * *